(12) United States Patent
Phipps (10) Patent No.: US 8,491,722 B2
(45) Date of Patent: Jul. 23, 2013

(54) PIPELINE PIGS

(75) Inventor: John Phipps, Cheshire (GB)

(73) Assignee: Cokebusters Ltd, Chester (GB)

( * ) Notice: Subject to any disclaimer, the term of this patent is extended or adjusted under 35 U.S.C. 154(b) by 794 days.

(21) Appl. No.: 12/235,928

(22) Filed: Sep. 23, 2008

(65) Prior Publication Data

US 2009/0078283 A1    Mar. 26, 2009

(30) Foreign Application Priority Data

Sep. 24, 2007    (EP) .................................... 07018690

(51) Int. Cl.
*B08B 9/093*    (2006.01)
(52) U.S. Cl.
USPC ............. 134/22.18; 134/8; 134/21; 134/22.1; 134/22.11; 134/22.12; 73/37; 73/49.5
(58) Field of Classification Search
USPC ........................................................ 134/8, 18
See application file for complete search history.

(56) References Cited

U.S. PATENT DOCUMENTS

| | | | |
|---|---|---|---|
| 3,651,530 A | 3/1972 | Schultz | |
| 4,077,079 A | 3/1978 | Knapp | |
| 4,242,771 A | 1/1981 | Knapp | |
| 4,244,073 A | 1/1981 | Sagawa | |
| 4,267,217 A | 5/1981 | Brooker | |
| 4,361,488 A * | 11/1982 | White et al. | ................... 210/776 |
| 4,406,031 A | 9/1983 | Eimer et al. | |
| 4,413,370 A | 11/1983 | Payne et al. | |
| 5,150,443 A | 9/1992 | Wijnberg | |
| 5,150,493 A | 9/1992 | Sivacoe | |
| 5,433,236 A * | 7/1995 | Zollinger et al. | ................. 137/1 |
| 5,924,158 A | 7/1999 | Watts | |
| 2002/0011124 A1 * | 1/2002 | Phipps | ........................ 73/865.8 |

FOREIGN PATENT DOCUMENTS

| | | |
|---|---|---|
| EP | 1172155 A2 | 1/2002 |
| GB | 2379258 A | 3/2003 |
| WO | 98/37990 A1 | 9/1998 |

OTHER PUBLICATIONS

European Search Report, Application No. 07018690.3, dated Feb. 21, 2008.
Co-pending application, U.S. Appl. No. 12/317,815, filed Dec. 30, 2008.

* cited by examiner

*Primary Examiner* — Eric Golightly
(74) *Attorney, Agent, or Firm* — The Dobrusin Law Firm, P.C.

(57) ABSTRACT

A method of monitoring a tube or pipeline, wherein an IP comprising an electronics module arrangement, is driven along the interior of the tube or pipeline by fluid pressure, wherein the IP transmits monitoring signals through the fluid that provides the pressure to the wall of the tube or pipeline, receives signals returned from the wall, analyzes the returned signals and stores data relating to the condition of the wall of the pipeline.

12 Claims, 10 Drawing Sheets

PIPELINE PIGS

CLAIM OF PRIORITY

The present application claims the benefit of the filing date of European Patent Application No. 07018690.3 (filed Sep. 24, 2007) the contents of which are hereby incorporated by reference in their entirety.

FIELD OF INVENTION

The present invention relates to improvements in or relating to pipeline pigs.

BACKGROUND OF THE INVENTION

The term pig is used to refer to devices that are passed through pipelines or tubing whether for cleaning the pipelines or for monitoring the internal surfaces and thickness of the pipes or tubes and for separation of product within the pipe or tube. This invention is particularly concerned with pigs that can be used to inspect pipelines or tubes from the inside to check for deposits and inconsistencies and irregularities in the walls of the pipelines or tubes. The invention further provides an integrated system whereby pipes or tubes can be sequentially cleaned with a cleaning pig and then inspected with a pig in which a common driving force is used to drive both types of pig through the pipelines or tube.

Although the invention is particularly useful with tubing used in oil refinery furnaces for carrying the hydrocarbons that are to be subject to high temperatures, it may also be used in connection with other pipes and tubing.

The tubing systems in refining furnaces such as crude oil distillation, vacuum thermal crackers, vis-breakers, delayed cokers and the like typically have a sinusoidal path through the furnace to optimise the exposure of the contents of the tube to the heat; this is frequently referred to as the furnace coil being serpentine. In a typical furnace or process fired heater the product to be treated usually passes downwardly through the tube system and in some furnaces the initial section of the tubing consists of an upper closely packed tubing section in which the temperature of the product to be treated is raised to the treatment temperature by convection heating. Typically the pre-heated product then passes down to a lower section of the tubing in which there is more space between the lengths of tubing and in this section the tubes are heated by radiant heat. Typically, in both sections the tube or process fired heater consists of straight sections joined by semicircular bend sections, known as u-bends.

In order for efficient and safe operation of such a tubular system it is important that the tubes are periodically cleaned and free from deposits and are also inspected to ensure the walls of the tube are free from undesirable deposits, tube material condition anomalies and/or degradation. Up to now such inspections have been performed on line through furnace viewing windows and/or during furnace shut down through use of a variety of manual techniques used on the cleaned external surface of the tube walls. All these methods have limitations of usefulness as well as being time consuming and costly. Additionally, where a furnace contains closely packed tubing such as is usually the feature of the higher level convection section, visual and manual inspection of tubes is impossible. Accordingly it may be necessary to replace that section of the tubing according to the lifetime warranty provided by the supplier which can result in unnecessary replacement of tubing and also unnecessary and costly downtime of the furnace.

In a further embodiment of this invention the inspection of the tube or piping is performed sequentially after the cleaning of the internal surface of the tube or piping. Traditionally furnace process tubes have been cleaned/decoked using the method known as 'steam air decoking'. More recently, since the mid 1990's, mechanical decoking or pig decoking has gained in favour in oil refineries around the world, widely replacing the practice of 'steam air decoking'. Mechanical decoking is carried out by driving an abrasive or scraper pig through the pipe or tube to scrape deposits from the internal surface of the pipe or tube. This can be accomplished by driving the abrasive pig through the tube under fluid pressure such as water pressure. For example a cleaning unit having water tanks and pumps can be driven to a refinery, linked up with the tubing within a refinery furnace to produce a circuit through which the cleaning pig may be driven under water pressure so that the debris obtained by the cleaning operation is removed from the tubing system in the water stream and can be separated from the water for disposal. The cleaning operation may be performed by several runs of the cleaning pig which can be in the same direction or in opposite directions. Currently, after the cleaning operation the tubing system may be inspected in a separate operation.

As previously mentioned it is known to send a pig through a pipeline for the purpose of clearing any blockage therein and for removing unwanted deposits that have formed on the inner wall thereof. Such a device finds application, for example, in the oil industry, especially for cleaning fired heater or furnace tubes in a refinery. Refinery fired heaters may be subjected to temperatures normally in excess of 200° C., and in specialist furnaces temperatures can exceed 700° C. Such conditions lead to the formation of carbonaceous deposits (coke) on the pipeline wall. A pig can then be forced therethrough under pressure of a fluid, for example water, such that the deposits are removed by friction as the pig scrapes along the pipeline wall. U.S. Pat. No. 5,924,158 discloses an exemplary pig suitable for this purpose. The pig may be passed through the pipeline, un-directionally or bi-directionally, several times to remove the coke. Decoking is carried out after the furnace has been taken out of service and cooled down.

However, the extreme conditions referred to above, usually exacerbated by the pressured flow of crude oil and semi-refined feedstock (oil) through the pipeline, can impose high levels of stress on the pipeline. Furthermore, high temperature refining activity within the furnace leads to separation of crude oil into its component parts, which can lead to corrosion of the tube wall. Decoking which is sometimes carried out by steam or air can also lead to a thinning of the tube wall.

Accordingly, regular monitoring of the condition of the tubing is required, to ensure that cleaning and/or decoking has been fully effective, and to ensure that the wall thickness has not been materially degraded by the cleaning or decoking or through the effects of the operation of the furnace in service. If a furnace tube is breached during operation in service this can be extremely dangerous potentially causing life threatening conditions. Similarly if a pipeline is allowed to deteriorate beyond safe limits, this can lead, in extreme cases, to a fracture, with the associated expensive and disruptive unscheduled downtime. Abrupt stoppages can also lead to blockage of the pipeline as the process materials carried thereby cool and increase in viscosity perhaps congealing.

Monitoring of the condition of tubing or a pipeline is conventionally carried out by radiography, precision monitoring of flow and pressure, or by thermal imaging. However, each of these techniques has disadvantages. Radiography can be time consuming, for example taking 6 or 7 days fully to radiograph an entire furnace, and it also requires the furnace tube to be abrasively cleaned on the outer wall to carry out the radiograph sample successfully. Furthermore, a furnace would normally need to be scaffolded internally to enable this work to be carried out, this being disadvantageous in time. Thermal imaging usually looks for hotspots as an indication of contamination although closely packed convection tubing cannot be inspected in this way. Monitoring is carried out whilst the furnace is in operation, and some areas of tube may not be visible from the access windows. Furthermore, the far side of tubes cannot be monitored by this technique.

It is also known to provide a tethered pig with monitoring equipment and to send it through a pipeline, in which operation of the equipment is controlled from outside the pipeline via an umbilical cable, a fibre-optic cable for example, and in which the responses detected by the on-board monitoring equipment are transmitted back along the cable to the external monitoring unit. However, such a monitoring pig is bulky, is not able to be used in pipelines of less than about 6 inches (15 cms) diameter, and is unable to navigate any useful distance through a serpentine tube coil such as will be found in a process fired heater.

It is an object of the present invention to provide a pipeline pig for, and a method of, monitoring a pipeline or tube coil in a convenient and an unmatched time efficient manner referred to herein as an "Intelligent Pig" abbreviated to "IP". The present invention therefore provides an IP capable of performing inspections of tube and piping from the interior of the tube or pipe which overcomes these problems. The present invention further allows the IP to be introduced into the tubular system following the cleaning operation by substituting the IP for the cleaning pig. This enables the same fluid driving and control system to be used for both the cleaning and inspection operations which is time saving and efficiency improving. This benefit is to some extent derived from the ability of the IP to perform its function without the need to contact clean metal on the internal tube wall. The acoustic signal from the IP travels through the fluid and echoes from the hard surface. That hard surface does not need to be clean steel. The signal echo system provided by this invention allows the system to distinguish between steel and coke or other material which is acoustically softer. Accordingly, the IP can be used during the course of the pig decoking and it is only necessary to establish a clear passageway so that the IP can securely pass from end to end.

This combination of pig decoking and pig inspection by the IP enables the IP to find areas where coke remains. This can helpfully and valuably impact on the decoking by guiding the decoking operators to areas where coke contamination remains, at the same time helping them to avoid wasting time running scraper pigs where no coke exists. This combination of decoking and inspection using the same machinery, equipment and manpower provides considerable time efficiency.

In a further preferred embodiment the IP is provided with flexible sleeves which help the IP to pass through a tube coil which is not thoroughly cleaned. This limits the danger of the IP becoming lodged in a tube coil having had its progress interrupted by patches of coke or other contamination.

European Patent Publication 1172155 describes a pipeline pig, which is self-contained, and which is small enough to pass through small bore pipelines, especially fired furnace tube systems. In one aspect EP 1172155 provides a pipeline pig for monitoring a pipeline from the interior thereof, the pig comprising an electronics module arrangement, which may be enclosed within an outer casing, wherein the electronics module arrangement comprises a transmitter for transmitting monitoring signals to the wall of the pipeline, a receiver arrangement for receiving transmitted signals returned from the wall of the pipeline, a microprocessor for analysing the received signals, a data logger for storing the data analysed by the microprocessor, and a source of electrical power for supplying the transmitter, receiving arrangement, microprocessor and data logger. The elements are connected by a cable.

The pig of EP 1172155 is not dependent on a power supply that is external to the pipeline, and is able to analyse and store onboard the results of the monitoring for subsequent downloading when the pig has exited the pipeline and by selecting suitably miniaturised components for the electronics module arrangement, the pig can be produced down to a size to allow it to pass through tubes with, for example, a diameter down to 85 mm. Since there is no tethering required for the pig, it can conveniently be sent through convoluted pipeline configurations from end-to-end, without the risk of snagging.

In the system of EP 1172155 the pig is driven through the tubing system by fluid, preferably water pressure, against the rear section of the pig. This has the disadvantage that the gap between the emitters and receivers provided within the pig for sending and receiving the signals which are used to monitor the inner surface of the tubing can be inconsistent in that it is part air and can also contain some fluid due to leakage of the fluid around both the nose cone of the pig and the rear section of the pig.

A further disadvantage of the system of EP 1172155 is that it does not provide the combination of strength and flexibility required for successful operation of the system.

SUMMARY OF INVENTION

The present invention provides an IP that overcomes these problems.

According to one aspect of the present invention the front end of the IP is provided with a tractor sleeve which is a flexible tapered sleeve that captures the driving fluid so that the IP is driven along the tube. The tractor sleeve fits tightly over the casing of the pig which is preferably of stainless steel. The sleeve should be dimensioned so that it fits tightly up against the tube inner wall and is designed to provide a flexible 'cup' which seals firmly against the internal tube wall regardless of anomalous imperfections in the internal bore. The sealing effect of the tractor sleeve increases as the fluid pressure increases. The fluid fills the cup and forces the thinner flexible edges into the tube wall perfecting the seal and causing the IP to be controllable and smooth in its running. The fluid is preferably water. This tight but pliable fit within the tube allows the sleeve to flex over wall anomalies and small obstructions in the tube walls yet maintain a neat seal against the tube. The sleeve is preferably thick and strong at the root where it is attached to the IP body and is tapered, preferably uniformly, to a point that flexibility increases as the sleeve meets the tube inner wall. This design helps to centralise the IP within the tube and also inhibits passage of the driving fluid, generally water, which could stall the IP's steady progress. The IP is also provided with a rear 'petal' disc to allow water to flood around the acoustic carriage and fill the spaces between the central sections of the IP and the inner walls of the tube or piping. Furthermore the petals of the disc should sit firmly up against the tube inner wall to ensure a) protection of the acoustic carriage from impact, and b) the centring of the carriage within the tube or pipeline.

BRIEF DESCRIPTION OF THE DRAWINGS

The present invention is illustrated by reference to the accompanying drawings in which.

DETAILED DESCRIPTION OF THE INVENTION

Figure 1:
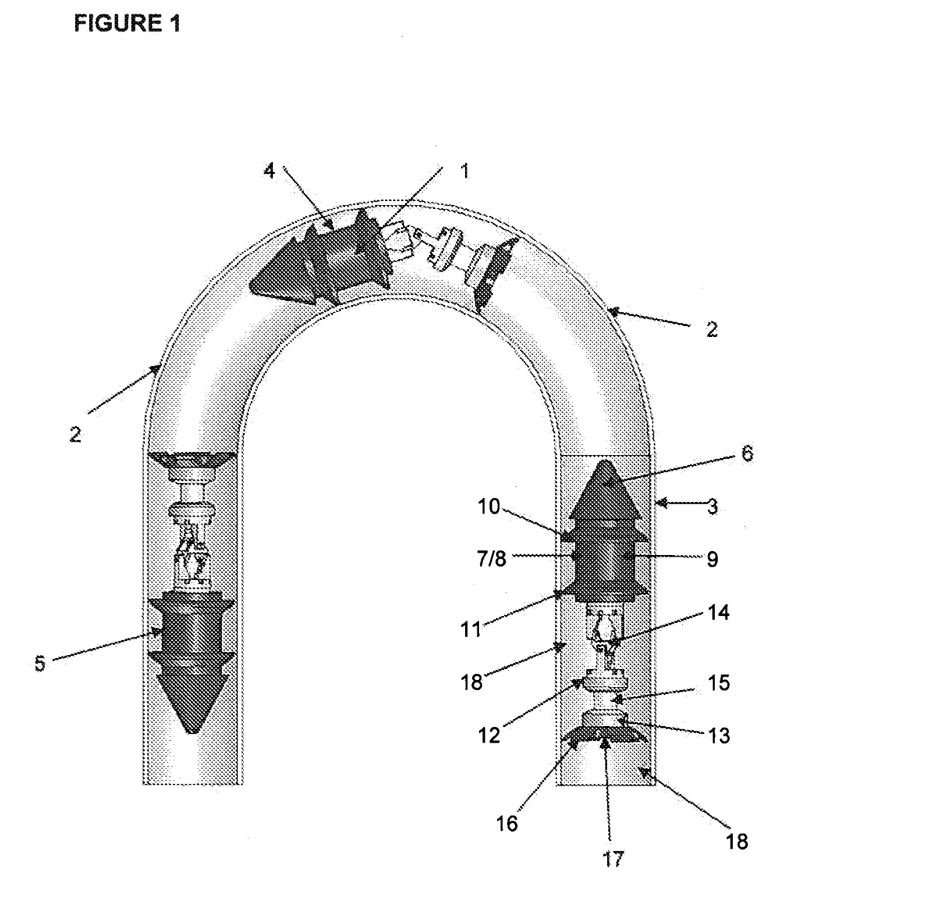
FIG. 1 is a diagrammatic illustration of an IP according to the present invention and shows it in different locations within a serpentine tubular structure.

FIG. 1 shows an IP of the invention (1) in various positions in a refinery tube (2) showing the IP approaching a bend at position (3), passing around a bend in the tube at position (4) and moving away from the bend at position (5).

As is shown in FIG. 1 the IP (1) is made up of several components, a nose cone (6) to enable streamlined flow through the tube, a receiver electronics unit (7) which is below the cover (8) which carries the tractor sleeve (9) which consists of two tapered discs (10) and (11) integrally formed with the sleeve that covers the receiver electronics unit.

The receiver electronics unit (7) is connected to the transmitter unit (12) by means of a universal joint (14) and the illustration shows how, the universal joint (13) helps the IP pass around the bend at position (4). The transmitter unit consists of a transmitting carriage (12) around which are provided the transmitting units (not shown) built in to the carriage in the centre and are protected by two outer shoulders (12 and (15). The Acoustic carriage (12) and (15) carries a petal sleeve (16) which bridges the gap between the carriage and the inner wall of the tube. The petal sleeve is provided with gaps (17) around its circumference through which the driving fluid (18) can freely pass to ensure the acoustics are coated with fluid.

It will therefore be seen that in operation the discs (9) of the tractor sleeve form a cup as they are pressed by the driving fluid (8) against the inner wall of the tube and the volume between the IP and the inner wall of the tube will be filled with the driving fluid (18).

Figure 2:
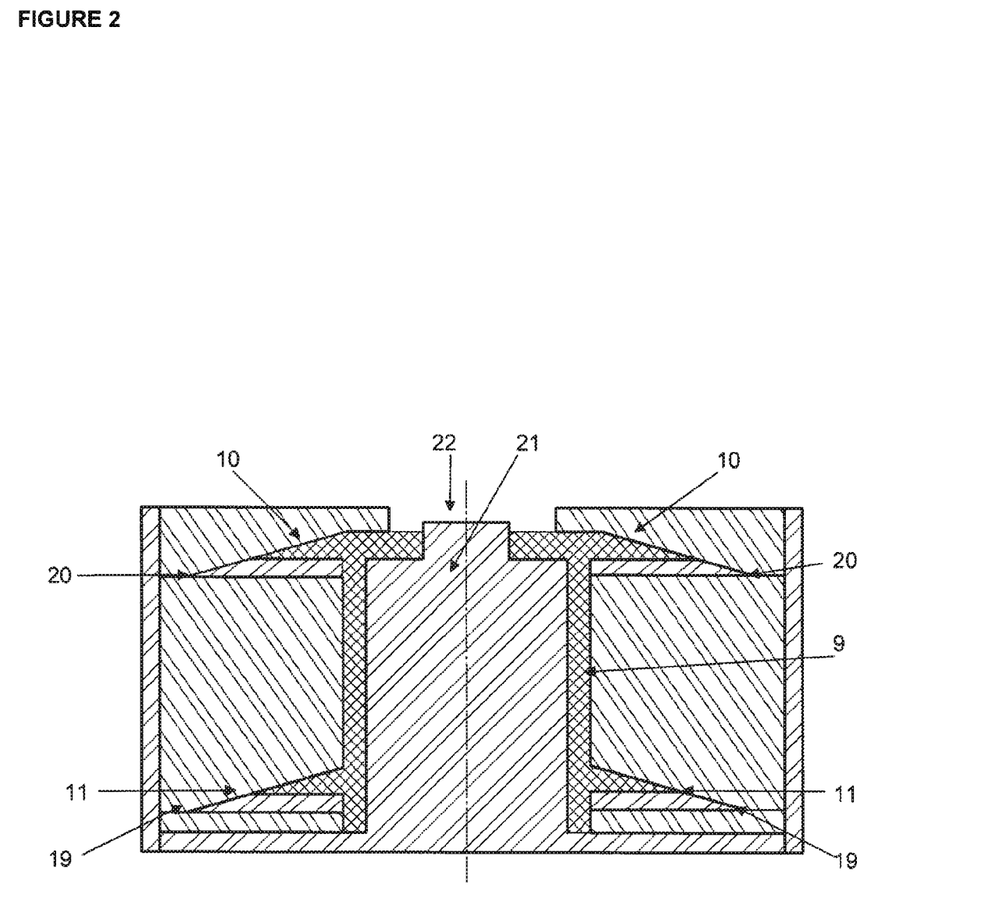
FIG. 2 shows the tractor sleeve that is provided around the nose cone of the IP according to the invention.

FIG. 2 is a more detailed view of the tractor sleeve (9) showing the tapered discs (10) and (11) In addition FIG. 2 shows how sleeves of different sizes can be provided using a single mould according to the diameter of the tube to be monitored. (19) and (20) are elements of the mould used to create the sleeve and their size can be varied to produce discs of the required dimensions. FIG. 2 also shows how the tractor sleeve has a hollow core (21) which can be slid over the front end of the receiver electronics unit (7) and secured by means of a screw thread (22) beyond the end of the sleeve for attachment to the nose cone (6) of the IP.

Figure 3:
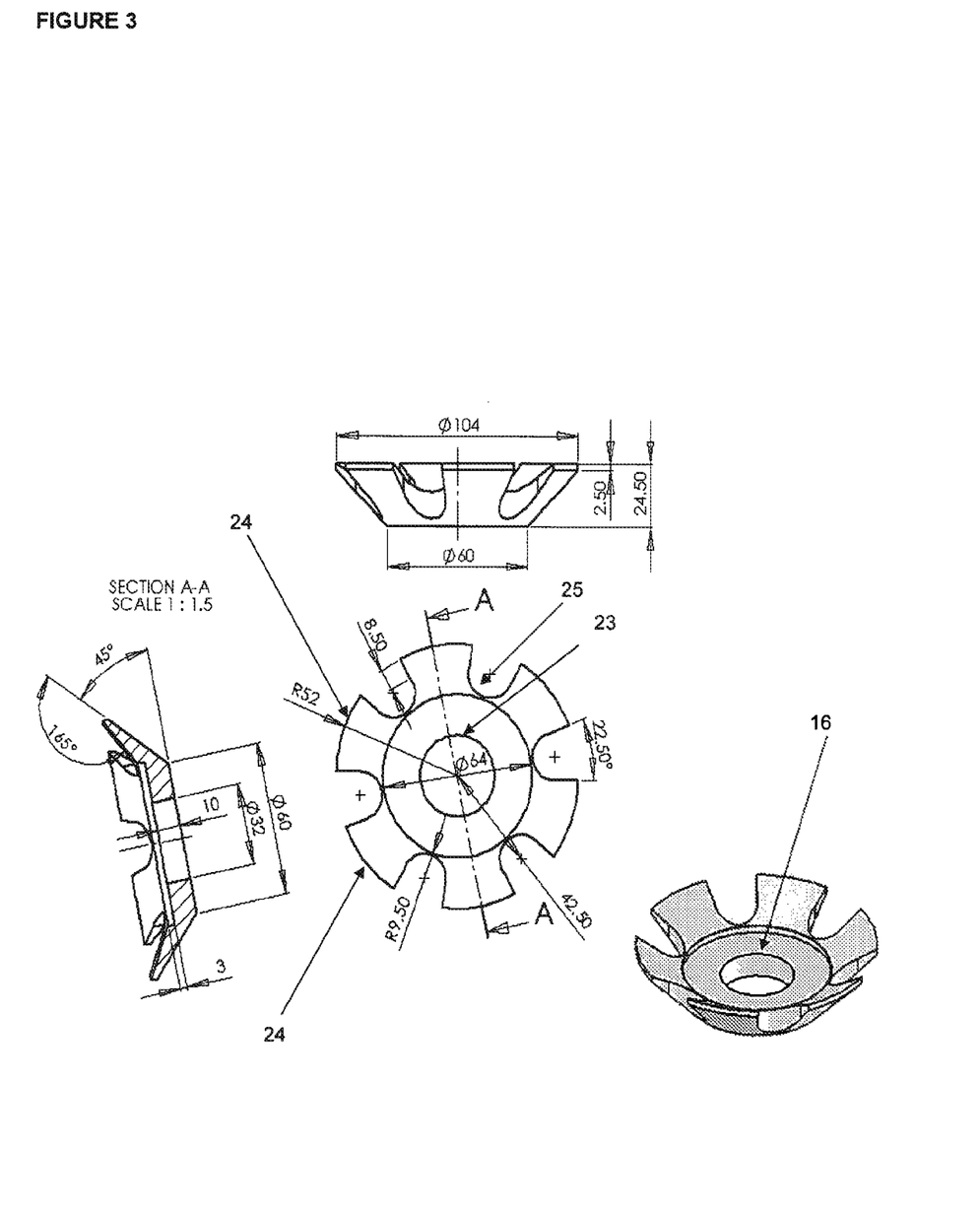
FIG. 3 shows the petal sleeve that is provided around the rear end of the IP according to the present invention.

FIG. 3 shows the design of the petal sleeve (16) which comprises a disc (23) provided with a series of protrusions (24) designed to extend from the IP to the inner surface of the tube. A series of gaps (25) are provided between the protrusions which enable the driving fluid (18) to pass through the gaps (25) and up to the tapered discs (10) and (11) to force them against the inner surface of the tube and drive the IP through the tube.

Figure 4:
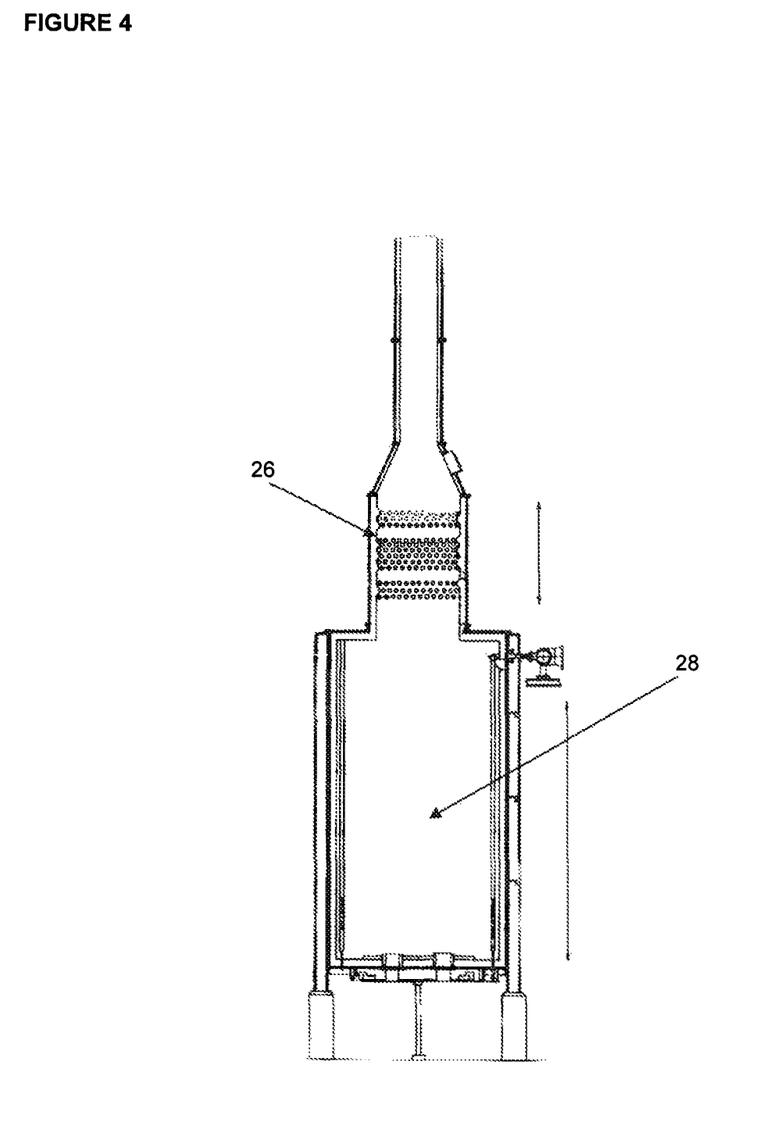
FIG. 4 is a diagrammatic illustration of the configuration of tubing that can be found in the convection and radiant sections of a refinery vis-breaking furnace.
Figure 5:
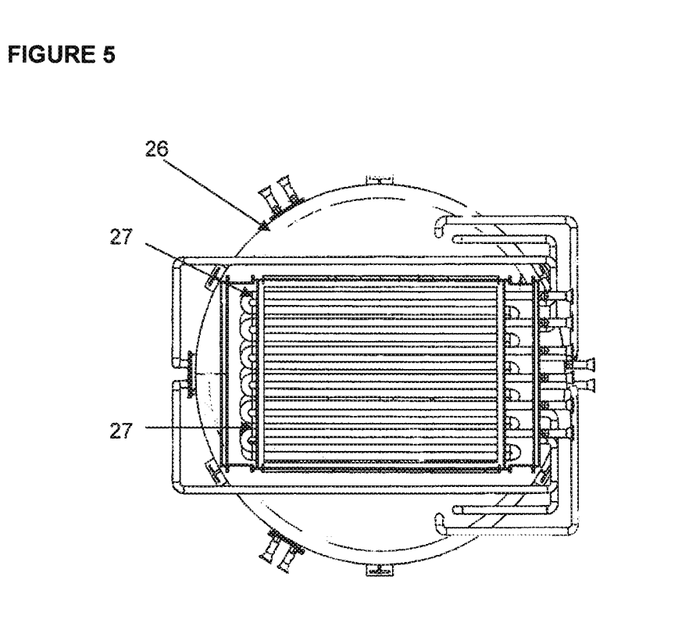
FIG. 5 is a top cross section of the convection cross section of the furnace shown in FIG. 4.
Figure 6:
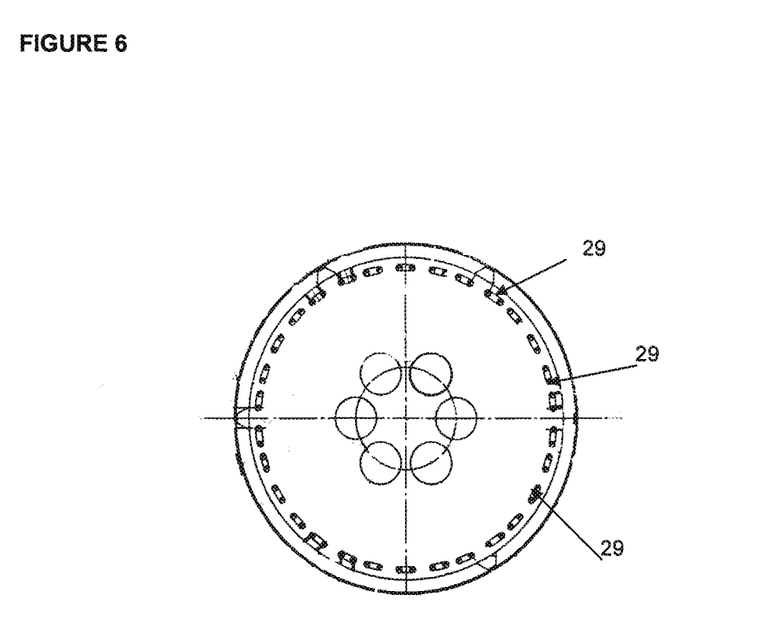
FIG. 6 is a top cross section of the radiant section of the furnace shown in FIG. 4.

FIG. 4 is a diagrammatic front elevation illustration of the tubing that can be found in a typical refinery vis-breaking furnace. The furnace consists of an upper convection section (26) and FIG. 5 is a cross section of the upper section (26) showing how the tubes (27) through which the oil flows have a closely packed serpentine configuration. The furnace has a lower radiant section (28) and FIG. 6 is a top cross section looking down on the radiant section (28) and showing how the tubes (29) follow a serpentine path around the inner wall of the furnace.

It will be seen that manual examination of the tubes (27) in the convection section would not be possible and that an external examination of the tubes (29) in the radiant section would be extremely onerous and time consuming. Both these difficulties can be overcome by the use of the IP according to the present invention.

Figure 7:
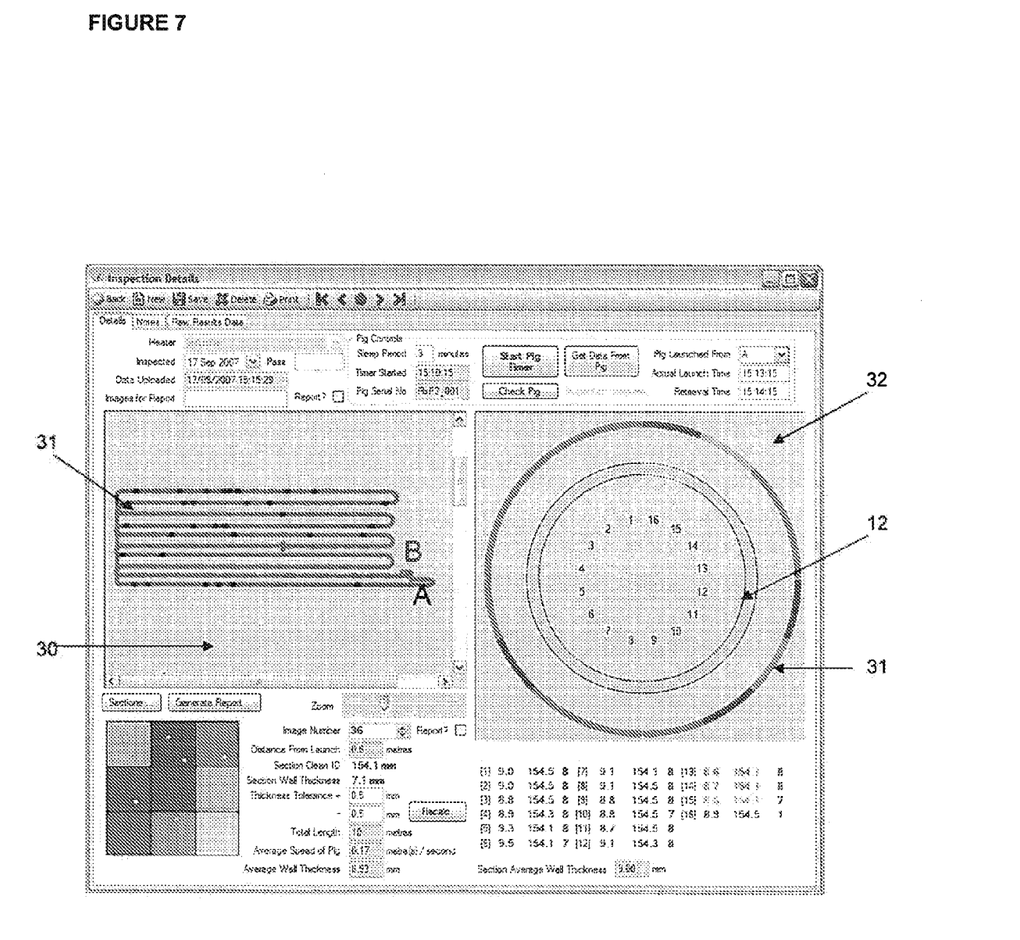
FIG. 7 shows the computer screen display that can be provided showing the condition of the tubing.

FIG. 7 is a screen display that can be generated from the information that is collected by passage of the IP through a tube. The left hand side of the screen (30) shows the serpentine tube (31) that is being monitored by the passage of the IP. The right hand side of the screen (32) is a cross section of the tube (31) and shows the software image representation of the tube wall (12) of the IP and the location of the 16 transmitters that are employed around the circumference of the transmitter unit. The data in the lower right of the display gives the measurements made by the 16 transmitters. Any weaknesses or imperfections shown on (32) can be immediately translated to the serpentine tube (31) to identify the location of the weakness.

Figure 8:
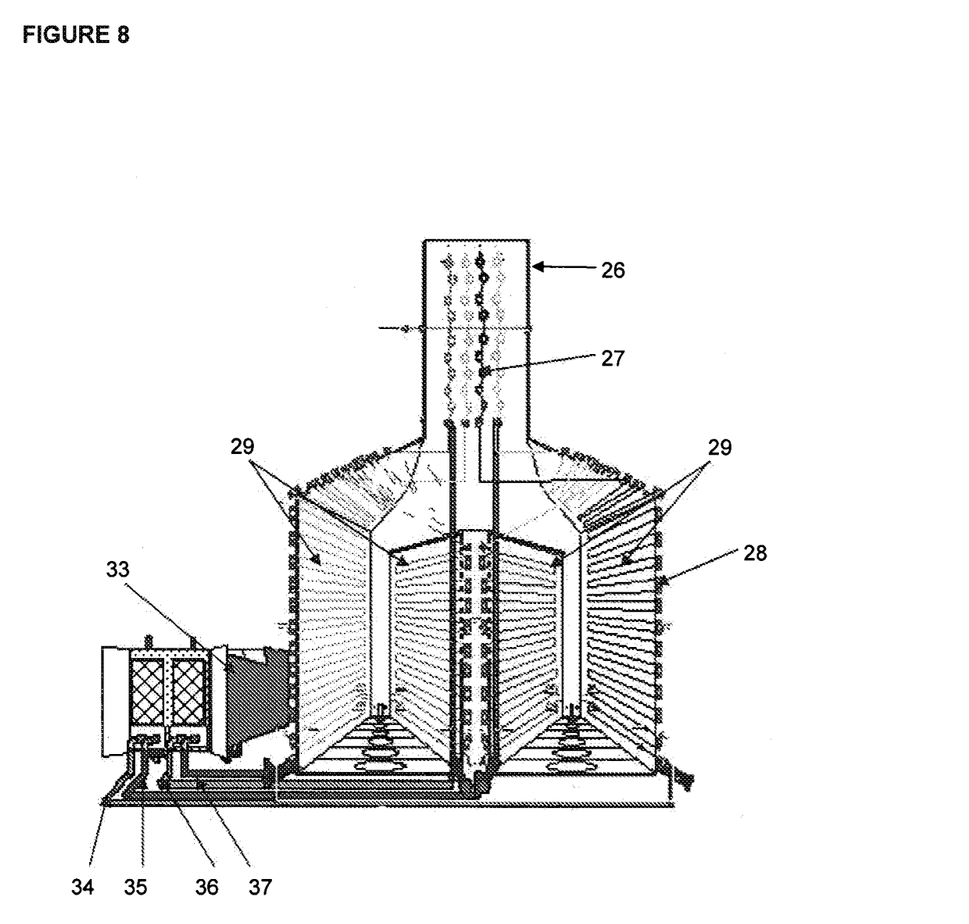
FIG. 8 shows a furnace similar to that shown in FIG. 4 with a section and a radiant section.

FIG. 8 is a diagrammatic illustration showing how a fluid delivery system can be connected up to the tube system of a furnace similar to the furnace shown in FIG. 4.

Figure 9:
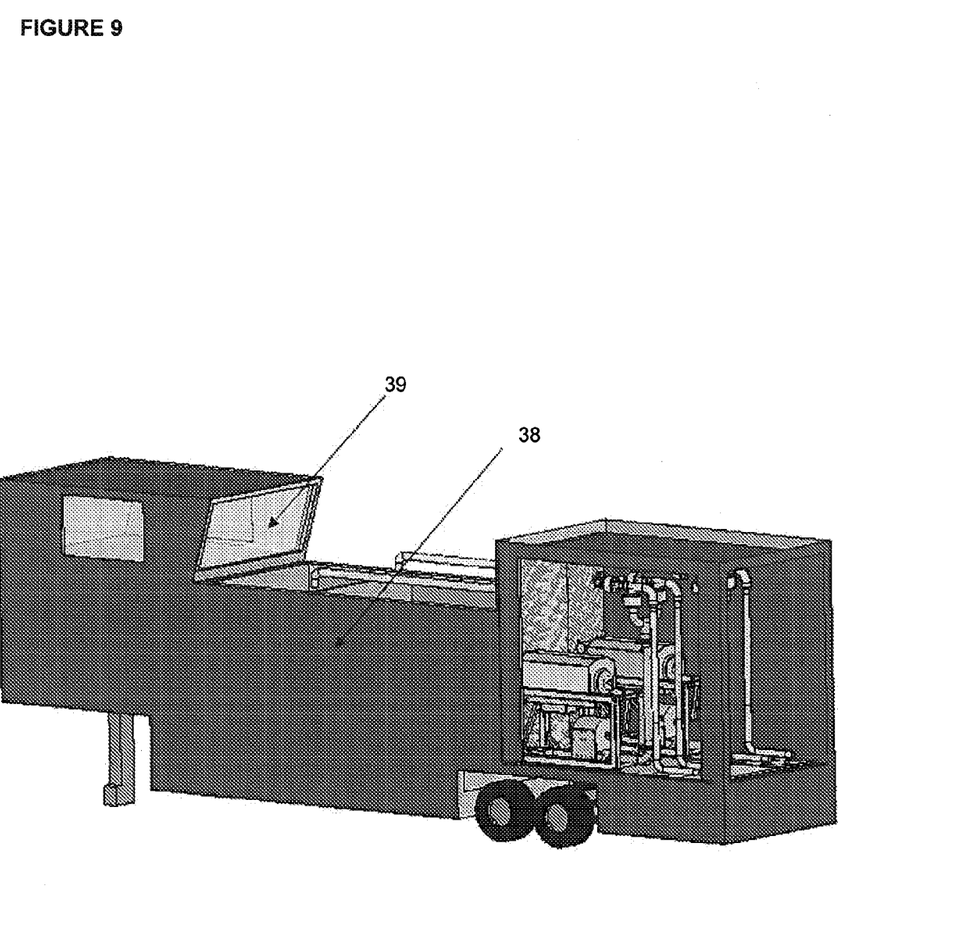
FIG. 9 is a view of the fluid delivery system depicted in FIG. 8 showing fluid storage tanks (38) and a control room (39).

FIG. 9 shows a mobile fluid delivery system as illustrated diagrammatically in FIG. 8.

Figure 10:
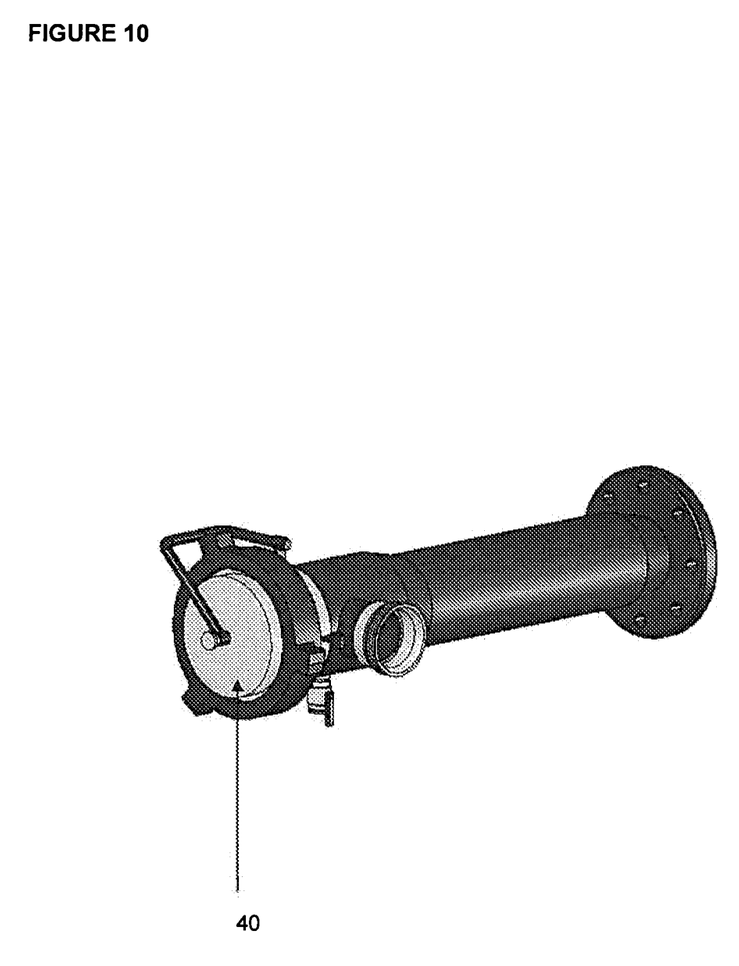
FIG. 10 shows a joint of the mobile fluid delivery system to the pipe connecting the system to the furnace tubing and how it may be provided with a removable cover (40).
Figure 11:
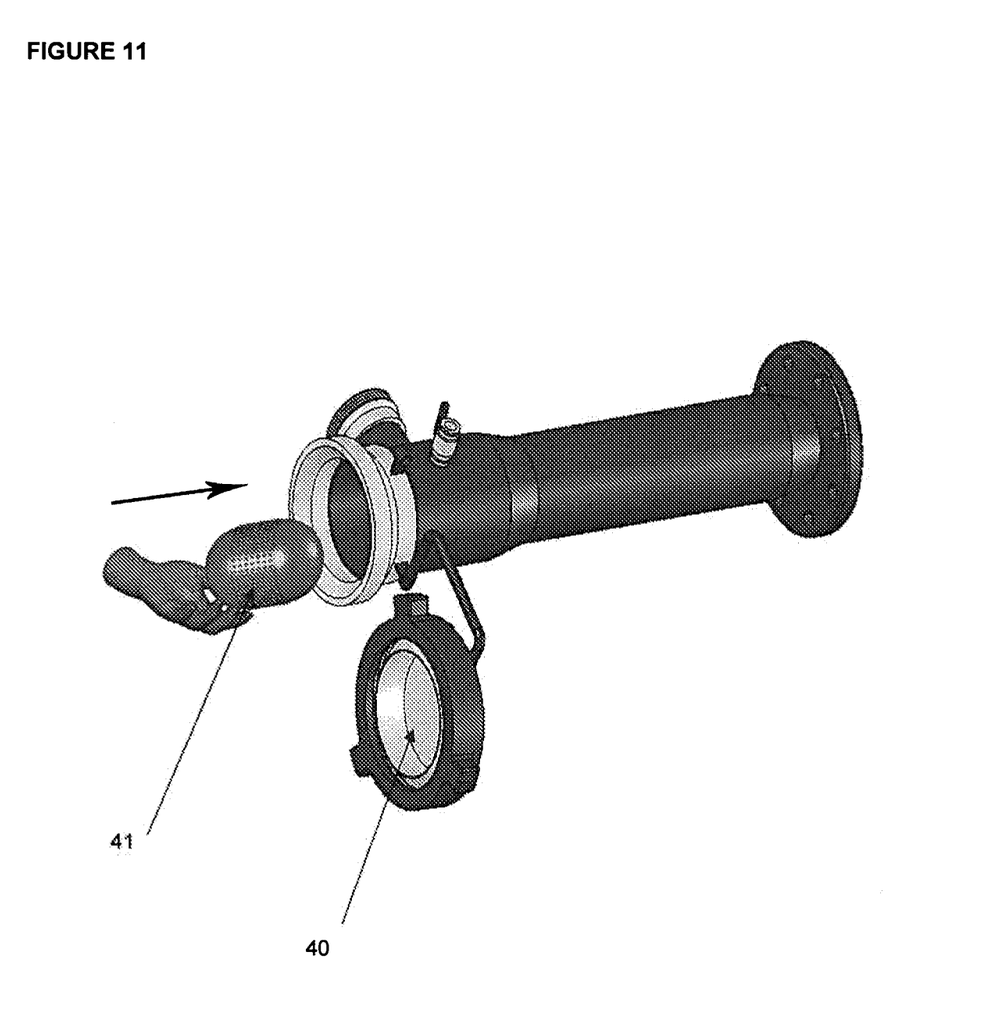
FIG. 11 shows an illustration of a use of the joint of FIG. 10.

FIG. 10 shows the connection of the mobile fluid delivery system to the piping system shown in FIG. 8 and FIG. 11 shows how a pig may be inserted into the pipe system.

FIG. 8 shows a furnace similar to that shown in FIG. 4 with a section and a radiant section. A fluid delivery system (33) is shown with pipes (34), (35), (36) and (37) connected to the tubing in the convective section and radiant section respectively. The system therefore provides a continuous loop for the delivery of fluid from the fluid delivery system for passage through the furnace tubes.

FIG. 9 is a depiction of the fluid delivery system depicted in FIG. 8 showing fluid storage tanks (38) and a control room (39). This unit can be delivered to the site to perform both cleaning and inspection of the tubes or pipes and contains specialist pumping equipment.

FIG. 10 shows the join of the mobile fluid delivery system to the pipe connecting the system to the furnace tubing and how it is provided with a removable cover (40).

FIG. 11 shows how the cover (40) may be removed to allow a pig (in this instance a cleaning pig) to be inserted into the system. After the pig is inserted (41) the cover may be replaced so that the pig is driven around the system by the fluid.

Accordingly in operation the fluid delivery system may be connected to the tubing in the unit. A cleaning pig may be inserted and driven around the loop by the fluid. The operators in the control room can observe the return fluid and when it becomes cleaner they can open the cover (40) and replace the cleaning pig (41) with an IP (1) of the invention. Alternatively the system can be used only for inspection and then only IP will be used.

The software and computer systems can if desired be provided in the control room (39) to provide real time data on screen such as that illustrated in FIG. 7.

Accordingly in one embodiment the invention provides a flexible tractor sleeve around the nose of the IP whose function is to:
- keep the IP centred in the tube or pipe system during passage through the tube or pipe system
- protect the casing which contains all the delicate and fluid sensitive electronics
- promote a smooth journey of the IP through the tube system which typically contains short radius u-bends along with a variety of inner tube wall obstructions such as erratic hydrocarbon build-up, weld intrusion and metallurgic or corrosion anomalies.

This design also improves the consistency of the speed of travel of the IP as it passes through a tube coil which assists in monitoring the location of the IP within the tubing.

Key features of the sleeves are:
- durability: to last a long journey through a tube coil typically 1,000 metres in length
- pliability/flexibility: to allow passage of the IP over lumps and bumps of obstructions
- ease of installation: the IP must be capable of use in tubes of differing diameters, currently 3.5" to 12". Accordingly by providing a variety of sleeve sizes, it is possible to ensure a neat fit of the IP into tube of different diameters. The sleeves should also be easy and quick to change, whilst maintaining security of fixing.

It has been found that polyurethane is a particularly useful material from which to make the sleeves.

Sleeves are cast in polyurethane using a mould that maintains a standard design throughout, but designed in such a manner that a range of sleeve diameters can be produced, typically from 85 mm to 300 mm.

The preferred tractor sleeve design has a tapered thickness which is a sharp point at the outer edge, but thickening for strength and reduced pliability as it joins the main body of the IP. This feature importantly causes the outer edge of the sleeve to bend as it touches against the tube wall. By bending backwards to its line of direction of travel a cup is formed which captures and seals the motive fluid, typically water. This seals the sleeve to the tube wall, serving to promote and maintain a constant and consistent lineal movement of the IP in response to the flow of driving fluid which can be monitored to provide information concerning the location of the IP within the tube.

In a preferred embodiment the IP front body features a stud such as a fine thread M20 stud projection which serves to locate the tractor sleeve as it fits on the front of the IP. Once firmly in place, the tractor sleeve can be securely held in its fixed position by a nose cone fitting, preferably of polyurethane which features a captive female thread suited to the stud such as the M20 stud.

The preferred nose cone itself has a unique aluminium mould which allows the thread to be firmly contained at the time of casting. The preferred IP sleeves are cast using a polyurethane mix.

In a further embodiment of the invention the rear end of the IP is provided with a 'petal' disc which fits over the rear end of the IP which may be the acoustic transducer carriage. The disc is designed to perform a number of key functions. The diameter of the petal disc is selected so that the transducer carriage is held in the centreline of the tube internal passageway. By centralising in this manner particularly when combined with the centralising effect of the tractor sleeve around the nose cone, pulse echoes can be more reliably recovered and measurements can be more easily translated to accurate measurements of the distances travelled by the pulses.

The shape of the petal disc combines a firm fit to the internal tube wall whilst allowing free passage of fluid in order to allow the pulses emitted by the IP consistent access to the fluid medium. The petal disc also provides protection for the transducer carriage by preventing it from touching the tube wall during its journey. The design achieves the ability to quickly change the 'petal' disc to accommodate tubes of different diameter whilst maintaining a firm fixing onto the carriage.

The petal disc/sleeve is preferably cast in polyurethane in the same manner as the tractor sleeve. The same mould may be used for the casting, although inserts are used in order to produce the recesses which are needed to allow fluid medium to flood the carriage body. Preferably the IP has an outer casing that is both flexible and durable, and may advantageously be made of a plastics material, for example polyurethane. The flexibility of the casing allows the IP to negotiate bends within the pipeline. The analysis of the returned signals can be arranged to discriminate between a steel wall (of the pipeline), carbon deposits (coke) and carbonaceous or inorganic scales (on the inner wall of the pipeline). The electronics module arrangement also provides a measurement of the thickness of tube or the pipeline wall, thus producing early indication of wear or corrosion anomaly therein.

Advantageously the electronics module arrangement is sealed into an outer casing, this being especially useful when the driving fluid is a liquid. It has been found that the electronic contents of an IP can be reduced in size and can be fitted into a space limited to two stainless steel containers.

Advantageously the signals transmitted by the transmitter are acoustic, preferably ultrasonic, signals. Although not preferred it is also envisaged, however, that a laser or radio transmitter may be used. It is preferred that the transmitter comprises a series of pulse sources located around the circumference of the transmitter section of the IP. The optimum number of transmitters and the frequency of pulsing will depend upon the tubing or piping that is being monitored. However it has been found that 16 transmitters are preferred. In the preferred system there are 16 transducers, preferably ceramic transducers, which are spaced equally around the IP and managed individually. A sequence starts with transducer 1 sending out 8 acoustic pulses. As each pulse recovers three echoes, this action provides data from 24 echoes. Then transducer 2 sends its 8 pulses. Then transducer 3 sends its 8 pulses, and so on until all 16 have sent their 8 pulses each. That is a sequence; the sequence is then repeated once. The two full sequences around the 16 transducers make up a cycle.

A preferred sequence is therefore made up as follows: 16 (transducers)×8(pulses)×3(echoes)=384 echoes per sequence. Since there are 2 sequences for each cycle in this preferred system, there are 768 echoes per cycle. The preferred system involves several cycles per second. For example, there may be 10 cycles per second in which case each second will produce 7,680 echoes containing data.

A cross sectional image of the tube can be produced by a sequence so with the system previously described there can be 20 cross section measurements per second. Assuming a typical speed of the IP of 1 metre per second through the pipe or tube this produces a detailed cross sectional tube image every 50 mm lineally. In order to produce more frequent images, the IP can be driven more slowly.

At a speed of travel of 1 meter per minute an IP will traverse a typical furnace tube coil of 480 meters end to end in a period of 8 minutes no more than 10. Several runs may be necessary to monitor an entire furnace an operation including 4 separated process runs of 480 meters amounting to 1,920 meters in total (approximately 6,300 feet) could be employed.

The speed of operation of the IP provides the distinct advantage that it is possible to make several runs through a tube coil, rather than just one without a great increase in the cost implications of furnace downtime. The owner wants to balance minimum downtime with valuable data recovered on tube condition. This invention can make valuable use of its time efficiency by making a second and third scanning run. As each run with identify a cross sectional detail every 50 mm (or so), then further runs will provide even more comprehensive coverage. If a run takes approximately 10 minutes, and allowing for the time to download the collected information a complete coil scan takes less than 30 minutes. This opens up the opportunity to conduct more scans without costing extra time. This is especially true when the IP scan can take place by interrupting the decoke cleaning operation for a short time such as 10 minutes—then whilst the scan download is carried out the decoking can proceed.

The electronics within the IP comprise an emitter arrangement and a receiver arrangement. The emitter sends out signals to the inner and outer surfaces of the walls of the tube or piping and these are bounced back from the internal and external surfaces of the walls of the tube to the receiver arrangement. Knowing the speed of travel of the signal through the medium that separates the emitter and the receiver from the walls of the tube the thickness of the wall of the tube can be calculated from the time difference between the receipt of the two signals.

The IP preferably uses piezo-electronic transducers in single or dual plate. In common with many devices of this type, either hand held or in other bodied forms, the acoustic pulse is transmitted from the transducer and its echoes are recovered, in this case the echoes are referred to as E1 and E2.

The E1 echo is the pulse hitting the hard inner surface of the tube wall and bouncing back to the transmitting transducer. The time taken is measured and calculated against the known speed of sound through the medium. For example the speed of sound in fresh water is known to be 1482 m/s at 20° C. Using the recorded time taken to recover the sonic echo, it is therefore a simple calculation to find the distance traveled. Adjustment can be made to allow for half the diameter of the transducer carriage to provide the inner tube radius as the result.

The E2 echo is the recovery of the echo from the outer wall of the tube. Approximately 83% of the energy in the original pulse is echoed back from the hard surface of the tube inner wall. The remaining energy of the pulse continues through the tube wall and produces a measurable echo bouncing back from the outer tube wall.

The recovery of this echo presents a further and relatively simple calculation. The time taken for the E1 transmission and recovery is deducted from the E2 in order to isolate the time taken for the pulse to travel through the tube wall from internal to external hard surface. This time can be calculated against the known speed of sound through the material of the tube wall to produce a thickness measurement. These features of acoustic technology are widely known and in varied use within specialist industrial practices.

This system provides two particular benefits which allow the recovery and presentation of valuable data concerning the state of the tube or pipeline.

The pulse will echo off the hard surface of the tube inner wall to provide E1. This hard surface may not necessarily be the clean tube wall and could be carrying remaining internal surface contamination. Unlike many inspection devices the IP of the present invention sends its sonic pulse to the tube walls through a fluid medium, typically water. It is not necessary for the acoustic transducer or sensor to touch the tube wall and, in fact, this is undesirable. The pulse travels through the fluid and hits the hard surface to echo back to the transducer. A measurement is therefore produced which is not dependent upon the tube surface being cleaned to it its material surface.

There is a further echo which is known here as the E3. For recovery and interpretation of this echo the IP uses particular software to produce valuable data from what may be termed as the "deteriorating echo".

E3 is actually a second echo derived from the first echo E1.

The first echo E1 returns from the internal tube wall and is received onto the transducer for storage and analysis of its information. A small percentage of the returning echo (E1) bounces off the receiving transducer or IP carriage surface and returns a second time to the tube internal wall. The strength of this echoed pulse is low and it is not moving in a clean straight line. The pulse spreads out from the transducer into a fan of approximately 5 degrees. When this acoustic pulse hits the tube internal wall it does not hit a single point surface so its echo contains comparative information which includes an acoustic 'footprint' of the nature of surface material and its consistency.

The returning information contained in E3 is plottable on a graph where axis 0-X can represent soft to hard material, and axis 0-Y can be smooth to rough and information can be displayed in a manner whereby different colours on the display can identify the various types of tube wall imperfections including the types of corrosion which may be existing in the metallurgy.

A further benefit of the present invention is that the IP can be accessed for programming and diagnostics which allows adjustments to be made to account for the speed of sound in different types of metal. Furnace process tubes are fabricated from a variety of metal types for example, occasionally in low temperature areas standard carbon steel is used; more frequently chrome steel is used, and sometimes stainless steel is employed. Each metal has a slightly different composite density and acoustic speed through each metal is accordingly slightly different. It is therefore possible to identify types of steel and make the necessary adjustment to the IP in order to maintain accuracy.

The receiver arrangement in the electronics of the IP may comprise an analogue receiver for receiving the returned signals and an associated digital receiver arranged to convert the analogue signals into digital form and to send the digital signals to the microprocessor. Thus, the digital receiver may conveniently comprise an analogue-to-digital converter. The power source preferably comprises a battery, and the electronics module arrangement advantageously comprises a charging circuit for a rechargeable battery pack which is integrated with the IP. For example, the battery may provide up to 2 hours operating time within the pipeline, and the module arrangement may be provided with a fast re-charger for maximum efficiency of usage of the IP.

Advantageously the electronics module arrangement comprises two interconnected modules, each module being enclosed within an outer casing, or coating, which provides impact and mechanical handling shock absorption protection. The modules are preferably connected by a universal joint which enables them to move relative to each other within the tube or piping and enhances the ability of the IP to negotiate short radius bends. The two modules may be linked by a reinforced and pressure sealed cable.

The components of the electronics module arrangement are advantageously sealed units, for protection against the environment, for example the water that is used to push the IP through the pipeline or tubing, wall contaminants, or oil product residue within an oil tube.

In accordance with a further aspect of the present invention, there is provided a method of monitoring a tube or pipeline, wherein an IP comprising an electronics module arrangement, preferably enclosed within an outer casing, is driven along the interior of the tube or pipeline by fluid pressure, wherein the IP transmits monitoring signals through the fluid that provides the pressure to the wall of the tube or pipeline, receives signals returned from the wall, analyses the returned signals and stores therewithin data relating to the condition of the wall of the pipeline.

Thus, the unharnessed, flexible IP of the present invention, with its self-contained onboard electronics can conveniently be sent through small bore and serpentine tubing and/or pipelines, and the information gathered thereby can subsequently be downloaded and reviewed by the operator usually after the pig has exited the pipeline. The monitoring may be carried out subsequent to a de-coking operation to determine its effectiveness, and/or may be carried out at other times, for example on a regular basis, so that a process engineer can establish a clear understanding of developing patterns of characteristics of the tube coil and/or pipeline. In this way erosion of the pipeline can be noted before it occurs to a damaging extent and preventative maintenance can be planned into the normal operation of the pipeline or tube, thereby avoiding undesirable downtime, and enhancing the cost effective management of the refining process, for example. In addition regular tube inspection by this convenient and time efficient method can be archived to produce trends of degradation so that a minimum condition can be confidently forecasted.

Monitoring of a tube or pipeline in accordance with the present invention can be completed in as little as 30 minutes due to the rapid firing of the acoustics which provide the necessary mass of date. This data can then be sifted at high speed by the controlling software which is able then to present informative displays which are packed with valuable details.

Bespoke and proprietary software is preferably used, and preferably it features an automatic link into a word processing package such as 'ms word' so that an Inspection Report is constructed automatically as the acoustic scanning proceeds. In this way the Inspection Report can be submitted for example in CD or printed form while the specialist equipment for cleaning and monitoring remains at the site where it is being used. This is highly beneficial for the decision making process of the site owner in order to determine whether or not the furnace should go back on line or instead to be taken out of service for maintenance.

A particular problem with IP technology, both in cleaning and inspection operations, is the ability to locate the position of the pig within the tubing accurately and consistently. In one embodiment the present invention provides a solution to this problem for the IP.

In the present invention the IP is preferably run, operated and controlled by a specialist pumping unit machine which houses a control room including all devices to control fluid flow and pressure. Included in these controls is the bespoke and proprietary software which can identify the location of the IP within the tube or piping and can integrate this information with the tube diameter and wall thickness measurements performed by the IP. The software can also sift through the masses of data to produce an easy to view display to aid in analysis of the results.

The display is a further embodiment of the present invention. Included in the image are all the measurements individually listed along with relevant reference data. Mainly the following two images can be provided:
  A general arrangement drawing of the tube serpentine coil.
  A cross sectional image of the tube at a given point in the scan.

This allows a technician viewer to identify areas of anomaly on the general arrangement part, then simply click on that area to be taken instantly to the cross section of tube at that particular location.

The operation of the system of the present invention can improve both the accuracy and consistency of the determination of location. The location can be determined by time whereby initially a recording is made of the time of the launch of the IP, allowing for a selected and set 'sleep time' to allow the pig to be taken from the control room and inserted into the pig launcher. A second recording is made of the time of recovery when the IP is known to arrive in the receiving launcher on completion of its passage through the tubing or pipeline. The controlling software takes into consideration the 'sleep period' followed by the moment of launch and the movement of recovery. The software then automatically plots the probable location of the IP based primarily upon the assumption that the pig makes uniform progress at a consistent speed through the tube coil. Such assumption is facilitated and supported by the sleeve design which enables the progress of the IP to be unimpeded by internal obstructions. The software presentation and imagery can then identify the location on the screen of a monitor.

The design of the tractor sleeve according to this invention helps in the identification of the location of the IP within the tube. As stated, the tractor sleeve is designed to form a cup shape to seal against the tube wall and ensure that the motive fluid provides for smooth and consistent progress of the IP along the serpentine closed circuit of pipeline or tubing. Additionally, the design of the sleeve includes flexibility which will allow the IP to navigate over and through patches of resistance without change of speed.

The management of the speed of movement of the IP within the tube is assisted by using fluid injection machinery which is designed and constructed to incorporate controls and gearing to promote consistent fluid pressure and thus consistent speed of travel of the IP.

The location may also be determined by a pressure signal whereby the IP is run through a tube circuit driven by fluid provided by associated specialist pumping unit machinery. Differential pressure signals detected in the control of fluid pumping, once accurately filtered and interpreted by proprietary software can provide information on serpentine circuit changes of geometry. Typically, passage of the IP through the 180 degree u-bends will be detected by interpretation of fluid pressure differentials. Once the location of these signals is identified, the information is integrated with the location by time information to provide supporting evidence enhancing the accuracy of the identification of the location of the IP at all times during its journey through the pipe or tubing.

This provides a valuable feature which contributes to the ability of the technical operator to accurately locate the IP and thus identify the position in the tube of a particular measurement.

The software may be used on dedicated laptop computers in the control room of the fluid pumping unit machine. Differential water pressure information may be constantly fed to the computer from, for example, a Siemens Sitrans DS111 Transmitter or an Icenta Intelligent Electronic Pressure Switch DS400P. The pressure switch feeds to the computer an accurate signal for example through an armoured cable. The signal gives instantaneous reports of changes in the fluid, usually water, pressure which is driving the IP. Information is displayed on screen rather like a heart monitor, so unrestricted movement of the IP in a straight tube will typically show as a flat line—indicating a uniform pressure.

When the IP meets any restriction or change of direction, an instantaneous pressure increase is displayed on screen as a spike in the line of indication. The screen therefore displays a typical journey through a serpentine coil as a flat line of say 10 seconds followed by a spike, then a flat line of a further 10 seconds (assuming the tube lengths are generally the same) followed by the next spike etc. In this way the spikes can be seen as u-bend changes of direction and the IP can add information to better identify its location.

The pipeline or tube monitoring provided by the present invention may be integrated with the tube cleaning mechanisms which employ a scraping or cleaning pig. For example, a fluid pumping system may be connected up to the tubing system and a scraping or cleaning pig inserted into the launcher and then propelled through the tubing system by means of the fluid pressure. The fluid leaving the tubing system and containing the debris removed by the scraping operation can be observed, the debris removed and the clean fluid recycled. At some stage when the cleaning is substantially complete the fluid leaving the tubing system will become cleaner and contain less debris. At this time the cleaning pig can be replaced with an IP according to the present invention. In this way the same pumping system, fluid supply and control systems can be used for both cleaning and inspection which significantly improves the time efficiency of the operation and reduces furnace down time required for maintenance.

The system of the present invention therefore provides the following benefits.

1. Software may be used which is designed to include an automatic quality control. The IP may be fed with an expectation of measurements as advised by the owner of the tube coil or pipeline that is being inspected. Based on these expectations the software can reject data which is judged to be submitting impossible measurements. In fact the software can present lines and measurements based on the information from the scan but can code the presentation in order to advise the operator of the reliability of the data.

For example, software can be such that the sequences of 8 pulses emitted from each transducer automatically demand good data from at least 5 of these pulses before the data can be confidently used to draw an element of the on screen presentation.

2. The fast reporting can be made possible by the bespoke software which uses its power and design to filter data as it is being downloaded from the IP after its scanning run.

3. The rapid firing of acoustic pulses within the tube or piping allows the IP to move along at a reasonable speed. This allows the IP to complete a tube coil circuit in typically less than 10 minutes whilst still providing cross sectional images at a frequency of every 50 mm lineally or less.

4. The possibility to combine decoking and inspection not only provides time efficiency but also provides economies of shared mobilisation and contractual responsibilities. The use of a single piece of specialist equipment to carry out the joint operation is an efficiency in many aspects. Furthermore inspection can be conducted during the progress of the decoke thanks to the flexibility of the IP sleeves and the common control. This can improve the efficiency of the decoking operation.

5. It is not necessary for the tube internal wall to be perfectly clean in order to secure valuable measurement data of internal diameter and wall thickness.

6. The reporting images can be designed to be easy to read and easy to understand. Standard general arrangement features as well as tube cross sections can be used which can be familiar images which contribute to simplicity of display combined with comprehensive detail and accuracy.

From the above, it will be seen that in one aspect, the invention contemplates an intelligent pig ("IP") for monitoring tubes internally provided with one or more flexible sleeves which extend from the body of the IP to the interior wall of the tube. The IP may be further characterized by one or any combination of the following features: the IP is driven through the tube by fluid pressure in which at least one of the sleeves is a tractor sleeve provided towards the front of the IP and which is a flexible tapered sleeve that captures the driving fluid so that the IP is driven along the tube; at least one of the sleeves is dimensioned so that it fits tightly up against the tube inner wall and is designed to provide a flexible 'cup' which seals firmly against the internal tube wall; the IP is provided with a rear 'petal' disc which extends from the body of the IP to the interior wall of the tube to allow the driving fluid to fill the spaces between the central sections of the IP and the inner walls of the tube or piping; the IP comprises an electronics module sealed into an outer casing comprising a transmitter and a receiver (e.g., a transmitter that comprises a series of pulse sources located around the circumference of the transmitter section of the IP, wherein there may be 16 transmitters as pulse sources (such as a configuration in which pulses are emitted in a sequence which starts with transducer 1 sending out 8 acoustic pulses, as each pulse recovers three echoes, this action provides data from 24 echoes, then transducer 2 sends its 8 pulses, then transducer 3 sends its 8 pulses, and so on until all 16 have sent their 8 pulses each), the transmitters are spaced equally around the IP and managed individually, or both); the IP comprises two modules connected by a universal joint. There is also contemplated a method of monitoring a tube or pipeline using the IP of the above aspect.

In another aspect, there is contemplated a method of monitoring a tube or pipeline using the IP wherein an IP comprising an electronics module arrangement, is driven along the interior of the tube or pipeline by fluid pressure, wherein the IP transmits monitoring signals through the fluid that provides the pressure to the wall of the tube or pipeline, receives signals returned from the wall, analyses the returned signals and stores data relating to the condition of the wall of the pipeline. This aspect may be further characterized by one or any combination of the following features: the monitoring is carried out subsequently to an operation for cleaning the internal surface of the tube or piping; the cleaning is performed by a scraping pig (e.g., per which the scraping pig is driven through the tube or piping by the fluid pressure); the IP is driven by a specialist pumping unit machine which controls fluid flow and pressure and included in the controls is software which can identify the location of the IP within the tube or piping.

The invention also contemplates a process in which pipeline or tube monitoring with an IP is integrated with internal cleaning of the pipeline or linking with a scraping pig wherein a fluid pumping system is connected up to the tubing system and a scraping or cleaning pig is propelled through the tubing system by means of the fluid pressure, the fluid leaving the tubing system and containing the debris removed by the scraping operation is observed, the debris removed and the clean fluid recycled and when the cleaning is substantially complete the cleaning pig is replaced with the IP.

The invention claimed is:

1. A method of monitoring a tube or pipeline comprising:
   a) driving an intelligent pig ("IP"), which includes an electronics module arrangement, along an interior of the tube or the pipeline by fluid pressure;
   b) transmitting a monitoring signal, through a fluid that provides the fluid pressure, to an inner surface of a wall of the tube or piping and an outer surface of the wall of the tube or piping;
   c) receiving signals returned from the wall through the fluid;
   d) controlling and operating the IP;
   e) analyzing the returned signals;
   f) calculating a time difference between a receipt of the signal to the inner surface of the wall and the receipt of the signal to the outer surface of the wall so that a thickness of the wall can be calculated; and
   g) storing data relating to a condition of the wall of the tube or the pipeline;
   wherein the IP is driven by a specialist pumping unit machine that includes controls and control software that can identify a location of the IP within the tube or the piping, and the specialist pumping unit machine controls fluid flow and pressure.

2. The method according to claim 1, further including the step of cleaning the inner surface of the tube or the pipeline.

3. The method according to claim 1, further including a step of distinguishing between walls of the tube or piping and contaminants on the walls of the tube or piping.

4. The method according to claim 2, further including a step of distinguishing between the walls of the tube or piping and contaminants on the walls of the tube or piping.

5. The method according to claim 1, further including a step of flooding a carriage of the IP.

6. The method according to claim 2, further including a step of flooding a carriage of the IP.

7. The method according to claim 3, further including a step of flooding a carriage of the IP.

8. The method according to claim 1, further including a step of bending a casing of the IP so that the IP can negotiate bends within the tube or piping.

9. A method according to claim 2, wherein the cleaning is performed by a scraping pig.

10. A method according to claim 9, wherein the scraping pig is driven through the tube or piping by the fluid pressure.

11. The method according to claim 1, wherein the Intelligent Pig ("IP") is sequentially used with internal cleaning of the pipeline or linking with a scraping pig;
    wherein a fluid pumping system is connected up to the tube or pipeline and a scraping or cleaning pig is propelled through the tubing or pipeline by means of the fluid pressure, the fluid leaving the tube or pipeline and containing debris removed by the scraping pig is observed, the debris removed and clean fluid recycled and when the cleaning is substantially complete the cleaning pig is replaced with the IP.

12. A method according to claim 1, wherein the IP includes sixteen transmitters and each transmitter sends out eight acoustic pulses, which provide data from twenty-four echoes.

* * * * *

UNITED STATES PATENT AND TRADEMARK OFFICE
CERTIFICATE OF CORRECTION

PATENT NO. : 8,491,722 B2  
APPLICATION NO. : 12/235928  
DATED : July 23, 2013  
INVENTOR(S) : John Phipps Page 1 of 1

It is certified that error appears in the above-identified patent and that said Letters Patent is hereby corrected as shown below:

In the Claims

Column 16, Line 24, delete "tubing" and insert --tube--

Signed and Sealed this  
Fifteenth Day of October, 2013

Teresa Stanek Rea  
*Deputy Director of the United States Patent and Trademark Office*